US012594673B2

(12) United States Patent
Hanssen et al.

(10) Patent No.: US 12,594,673 B2
(45) Date of Patent: Apr. 7, 2026

(54) METHOD OF CALIBRATING MANIPULATOR, CONTROL SYSTEM AND ROBOT SYSTEM

(71) Applicant: ABB Schweiz AG, Baden (CH)

(72) Inventors: Sven Hanssen, Västerås (SE); Hans Andersson, Västerås (SE); Johan Noren, Västerås (SE)

(73) Assignee: ABB Schweiz AG, Baden (CH)

( * ) Notice: Subject to any disclaimer, the term of this patent is extended or adjusted under 35 U.S.C. 154(b) by 120 days.

(21) Appl. No.: 18/556,276

(22) PCT Filed: Apr. 29, 2021

(86) PCT No.: PCT/EP2021/061262
§ 371 (c)(1),
(2) Date: Oct. 19, 2023

(87) PCT Pub. No.: WO2022/228680
PCT Pub. Date: Nov. 3, 2022

(65) Prior Publication Data
US 2024/0181646 A1    Jun. 6, 2024

(51) Int. Cl.
*B25J 9/16*        (2006.01)
*B25J 13/08*       (2006.01)

(52) U.S. Cl.
CPC ........... *B25J 9/1692* (2013.01); *B25J 9/1682* (2013.01); *B25J 13/085* (2013.01)

(58) Field of Classification Search
CPC ...... B25J 9/1692; B25J 9/1682; B25J 13/085; G05B 2219/39018; G05B 2219/39024;
(Continued)

(56) References Cited

U.S. PATENT DOCUMENTS

| | | | | |
|---|---|---|---|---|
| 2013/0079928 A1* | 3/2013 | Soe-Knudsen | ........ | B25J 9/1694 |
| | | | | 700/254 |
| 2016/0184996 A1 | 6/2016 | Ishige et al. | | |
| 2022/0226990 A1* | 7/2022 | Wu | ........................ | B25J 9/1682 |

FOREIGN PATENT DOCUMENTS

| | | |
|---|---|---|
| CN | 104044143 A | 9/2014 |
| CN | 104379308 A | 2/2015 |
(Continued)

OTHER PUBLICATIONS

Huang, Yalou, et al.; "Calibration of two cooperative manipulators via pseudo-closed-loop method"; IEEE International Conference on Systems, Man and Cybernetics. Information Intelligence and Systems (Cat. No. 96CH35929), vol. 2; Beijing, China; Oct. 14, 1996; 6 Pages.
(Continued)

*Primary Examiner* — Adam R Mott
*Assistant Examiner* — Matthew C Gammon
(74) *Attorney, Agent, or Firm* — Whitmyer IP Group LLC

(57)        ABSTRACT

A method of calibrating a manipulator of an industrial robot, the method including providing a primary manipulator having one or more primary joints and a primary mounting interface; providing a secondary manipulator having one or more secondary joints and a secondary mounting interface, where the primary mounting interface is substantially rigidly connected to the secondary mounting interface; providing a load sensor between the primary mounting interface and the secondary mounting interface, the load sensor being configured to provide load data indicative of loads between the primary mounting interface and the secondary mounting interface; controlling the primary manipulator to adopt at least one calibration state; for each calibration state, recording a primary joint position of at least one primary joint; and calibrating the secondary manipulator based on the at least one recorded primary joint position; wherein the primary
(Continued)

manipulator is controlled to adopt the at least one calibration state based on the load data; and/or wherein the calibration of the secondary manipulator is additionally made based on the load data.

17 Claims, 4 Drawing Sheets

(58) Field of Classification Search
CPC ........... G05B 2219/39048; G05B 2219/39049; G05B 2219/39529
See application file for complete search history.

(56) References Cited

FOREIGN PATENT DOCUMENTS

| | | | |
|---|---|---|---|
| CN | 107428009 | A | 12/2017 |
| DE | 102009005495 | A1 | 7/2010 |
| EP | 2783807 | A2 | 10/2014 |
| EP | 2796249 | A1 | 10/2014 |
| EP | 2783807 | A3 | 2/2015 |
| TW | 202015868 | A | 5/2020 |
| WO | 2018153474 | A1 | 8/2018 |

OTHER PUBLICATIONS

Bonitz, R. G., et al.; "Calibrating A Multi-Manipulator Robotic System"; IEEE Robotics & Automation Magazine, vol. 4, No. 1; Mar. 1, 1997; 5 Pages.

Bergström, Gustav, et al.; "Evaluation of Calibration Method for Redundant Dual Arm Industrial Robots Using Internal Sensors"; Department of Automatic Control, Lund University, Sweden; 2017; 81 Pages.

International Search Report and Written Opinion of the International Searching Authority; Application No. PCT/EP2021/061262; Completed: Dec. 21, 2021; Mailing Date: Jan. 7, 2022; 19 Pages.

International Preliminary Report on Patentability; Application No. PCT/EP2021/061262; Issued: Oct. 24, 2023; 11 Pages.

Chinese Office Action; Application No. 2021800962419; Completed: Aug. 12, 2025; Issued: Aug. 14, 2025; 18 Pages.

* cited by examiner

METHOD OF CALIBRATING MANIPULATOR, CONTROL SYSTEM AND ROBOT SYSTEM

TECHNICAL FIELD

The present disclosure generally relates to calibration of robotic manipulators. In particular, a method of calibrating a manipulator of an industrial robot, a control system for calibrating a manipulator of an industrial robot, and a robot system comprising a control system, are provided.

BACKGROUND

A manipulator of an industrial robot may comprise a plurality of joints and a plurality of intermediate links. To be able to determine the position of the manipulator, each joint is usually provided with an angle measuring device in the form of an encoder or a resolver indicating the position of the joint relative to a zero position. By reading the joint positions, a pose (position and orientation) of a tool center point, TCP, of the manipulator can be determined.

Before the manipulator can be used it must be calibrated, e.g. calibrating each of the angle measuring devices with reference to the zero position. Calibrating the manipulator can be a tedious and difficult operation, but is also very important. The manipulator may be calibrated at its manufacturing site before it is delivered. Such calibrations however typically require expensive measurement equipment, such as a laser tracking system. For this reason, field calibration, e.g. at a production site where the manipulator operates, is less common. Instead, the manipulator is often returned to the manufacturer for calibration.

TW 202015868A discloses a method for calibrating the TCP of a robot arm. The method detects the gravity and torque of a tool and the contact force and contact torque of the TCP with a force sensor of the robot arm. The contact force and contact torque of the TCP respectively minus the gravity and torque of the tool are used to calculate the tension arm of a net contact force. The tension arm determines the coordinate of the TCP to automatically calibrate the TCP of the robot arm.

SUMMARY

One object of the present disclosure is to provide an improved method of calibrating a manipulator of an industrial robot.

A further object of the present disclosure is to provide a method of calibrating a manipulator of an industrial robot, which method provides an accurate calibration.

A still further object of the present disclosure is to provide a cost-efficient method of calibrating a manipulator of an industrial robot.

A still further object of the present disclosure is to provide a method of calibrating a manipulator of an industrial robot, which method can easily be carried out in the field.

A still further object of the present disclosure is to provide a method of calibrating a manipulator of an industrial robot, which method solves several or all of the foregoing objects in combination.

A still further object of the present disclosure is to provide a control system for calibrating a manipulator, which control system solves one, several or all of the foregoing objects.

A still further object of the present disclosure is to provide a robot system comprising a control system, which robot system solves one, several or all of the foregoing objects.

According to a first aspect, there is provided a method of calibrating a manipulator of an industrial robot, the method comprising providing a primary manipulator having one or more primary joints and a primary mounting interface; providing a secondary manipulator having one or more secondary joints and a secondary mounting interface, where the primary mounting interface is substantially rigidly connected to, or rigidly connected to, the secondary mounting interface; providing a load sensor between the primary mounting interface and the secondary mounting interface, the load sensor being configured to provide load data indicative of loads between the primary mounting interface and the secondary mounting interface; controlling the primary manipulator to adopt at least one calibration state; for each calibration state, recording a primary joint position of at least one primary joint; and calibrating the secondary manipulator based on the at least one recorded primary joint position; wherein the primary manipulator is controlled to adopt the at least one calibration state based on the load data; and/or wherein the calibration of the secondary manipulator is additionally made based on the load data.

In the method, the primary manipulator is used as a measurement manipulator. If the primary manipulator is well calibrated, the primary manipulator can be used as a measurement device for various measurements in its surroundings. However, if the primary manipulator is subjected to external loads, the accuracy of such measurements will be reduced if the external loads are not taken into account.

By means of the load data from the load sensor, information regarding external loads acting on the primary manipulator is obtained. By taking these external loads into account, and/or by moving the primary manipulator to one or more manipulator poses where such external loads are reduced or eliminated, the calibration of the secondary manipulator is improved.

The load sensor may be rigidly connected to each of the primary mounting interface and the secondary mounting interface, for example by means of one or more fasteners, such as screws. A positioning of the load sensor between the mounting interfaces is relatively straightforward and can therefore be carried out by less experienced users. The positioning of the load sensor between the mounting interfaces provides more accurate values of loads acting between the mounting interfaces, in comparison with a calculation of such loads based on a load sensor in one of the primary joints of primary manipulator. Thus, the positioning of the load sensor between the mounting interfaces enables an accurate control of the loads between the mounting interfaces, such as a zero load.

The method may further comprise determining a primary TCP (tool center point) pose of the primary manipulator based on the at least one primary joint position, and optionally based on the load data, by means of forward kinematics for each calibration state. Since the primary mounting interface is rigidly connected to the secondary mounting interface, there is a fixed and known relationship between the primary TCP pose and a secondary TCP pose of the secondary manipulator. A TCP pose defines both a position and an orientation of the TCP. The primary TCP position and the secondary TCP position may coincide or may be offset from each other. The primary TCP orientation and the secondary TCP orientation may or may not be angled relative to each other. In one example, the primary TCP pose and the secondary TCP pose coincide. In case a load as determined by the load sensor acts on the primary manipulator, a corresponding load acts on the secondary manipulator.

The method may further comprise recording a recorded secondary joint position of at least one secondary joint for each calibration state. The method may further comprise calculating a calculated secondary joint position of at least one secondary joint based on the secondary TCP pose, and optionally based on the load data, by means of inverse kinematics for each calibration state. The method may further comprise calibrating the secondary manipulator based on the at least one recorded secondary joint position and the at least one calculated secondary joint position for each calibration state. In this way, the secondary manipulator is calibrated based on the at least one recorded primary joint position.

According to one variant, the secondary manipulator is controlled with a reduced stiffness throughout the method. In this way, the secondary manipulator is made compliant and can be moved by the primary manipulator to a plurality of different manipulator poses. Even though the primary manipulator and the secondary manipulator may be stationary in each calibration state, the primary manipulator may still exert a force and/or a torque on the secondary manipulator, or vice versa. In this case, internal friction of the manipulators may contribute to prevent the manipulators from moving. If forces and torques are transferred between the manipulators, the manipulators will deflect. If such deflection is not taken into consideration, the calibration will be inaccurate.

According to a further variant, the secondary manipulator is controlled with a high stiffness throughout the method. The secondary manipulator thereby remains substantially stationary and cannot be substantially moved by the primary manipulator. In this case, the primary manipulator may be controlled to exert a first load on the secondary manipulator in a first calibration state, and to exert a second load, different from the first load, on the secondary manipulator in a second calibration state. The load data for each calibration state may then be used together with the at least one recorded primary joint position for the calibration of the secondary manipulator.

In addition to the primary manipulator and the secondary manipulator, the method can be carried out by only additionally providing the load sensor. Thus, no expensive and sensitive measurement equipment is required. By using the primary manipulator as a measurement manipulator according to the method, the process is available in environments with two or more robotic manipulators. Furthermore, since load sensors are relatively cheap and since the method does not require a load sensor for each manipulator, the method is cost-efficient.

Each joint may be either rotational or translational. In addition to the at least one primary joint and the at least one secondary joint, the primary manipulator and the secondary manipulator may comprise at least two primary links and at least two secondary links, respectively. Each of the primary manipulator and the secondary manipulator may be a robotic arm.

The method may comprise controlling the primary manipulator to adopt one calibration state or a plurality of unique calibration states. Alternatively, or in addition, the method may comprise recording a primary joint position of each primary joint. Each mounting interface may for example be a tool flange.

As used herein, loads may include forces and/or torques. Furthermore, a manipulator pose defines a position of each joint of the manipulator. In some manipulators, a single TCP position can be obtained with different manipulator poses.

Furthermore, manipulators with more than six axes can obtain a single TCP pose with different manipulator poses.

The method according to the first aspect may use a control system of any type according to the second aspect and/or robot system of any type according to the third aspect.

The method may comprise controlling the primary manipulator to adopt a plurality of calibration states. In this case, each calibration state may be a unique manipulator pose of the primary manipulator.

In case the primary manipulator is controlled to adopt the at least one calibration state based on the load data, the load, as measured by the load sensor, may be minimized or locally minimized in each manipulator pose. In this way, deformations of the primary manipulator and the secondary manipulator can be reduced or eliminated. The load data can be used to identify any external loads acting on the primary manipulator and to move the primary manipulator to a manipulator pose where the primary manipulator is in a more relaxed state. In other words, the primary manipulator can be controlled to a manipulator pose where the primary manipulator is less deformed, or not deformed. By reducing the deformation of the primary manipulator, an estimation of the position of the primary manipulator, such as a pose of the primary TCP, can be improved.

In this variant, the load data is used when controlling the primary manipulator to adopt the at least one calibration state, but does not have to be considered for the calibration. For example, the forward kinematics for calculating the primary TCP pose can be performed purely based on the one or more primary joint positions and the inverse kinematics for calculating the calculated secondary joint positions can be performed purely based on the secondary TCP pose. The minimization may comprise, for each calibration state, controlling the primary manipulator such that the load is below a threshold value.

As an alternative example, the method may comprise controlling the primary manipulator to adopt a plurality of arbitrary calibration states, with one or several manipulator poses. In this case, the load data does not have to be considered when controlling the primary manipulator to adopt the respective calibration state. However, the load data is then used together with the at least one recorded primary joint position for the calibration of the secondary manipulator.

In case each calibration state is a unique manipulator pose of the primary manipulator, the method may further comprise moving the primary manipulator to a plurality of calibration states while moving the secondary manipulator by the primary manipulator by means of lead-through. This variant may thus further comprise controlling the secondary manipulator in a lead-through mode. In such lead-through mode, the stiffness of the secondary manipulator is reduced and the secondary manipulator is thereby made compliant. Although the secondary manipulator is in lead-through mode, loads may be transferred between the primary manipulator and the secondary manipulator, e.g. due to internal friction of the manipulators.

The load sensor may be configured to provide load data indicative of forces and/or torques. The load sensor may thus be a force sensor, a torque sensor or a force and torque sensor, such as a six axis (three forces and three torques) sensor.

According to a second aspect, there is provided a control system for calibrating a manipulator of an industrial robot, the control system comprising at least one data processing device and at least one memory having at least one computer program stored thereon, the at least one computer program comprising program code which, when executed by the at least one data processing device, causes the at least one data processing device to perform the steps of receiving load data from a load sensor indicative of loads, the load sensor being positioned between a primary mounting interface of a primary manipulator having one or more primary joints and a secondary mounting interface of a secondary manipulator having one or more secondary joints, where the primary mounting interface is substantially rigidly connected to, or rigidly connected to, the secondary mounting interface; controlling the primary manipulator to adopt at least one calibration state; for each calibration state, recording a primary joint position of at least one primary joint; and calibrating the secondary manipulator based on the at least one recorded primary joint position; wherein the primary manipulator is controlled to adopt the at least one calibration state based on the load data; and/or wherein the calibration of the secondary manipulator is additionally made based on the load data.

The at least one computer program may comprise program code which, when executed by the at least one data processing device, causes the at least one data processing device to perform, or command performance or, several or all of the steps described in the first aspect.

The at least one computer program may comprise program code which, when executed by the at least one data processing device, causes the at least one data processing device to perform the steps of controlling the primary manipulator to adopt a plurality of calibration states. In this case, each calibration state may be a unique manipulator pose of the primary manipulator.

In case the at least one computer program comprises program code which, when executed by the at least one data processing device, causes the at least one data processing device to perform the step of controlling the primary manipulator to adopt the at least one calibration state based on the load data, the load, as measured by the load sensor, may be minimized or locally minimized in each manipulator pose. Alternatively, or in addition, the at least one computer program may comprise program code which, when executed by the at least one data processing device, causes the at least one data processing device to perform the steps of controlling the secondary manipulator in a lead-through mode; and controlling the primary manipulator to move to a plurality of calibration states while controlling the secondary manipulator in the lead-through mode.

According to a third aspect, there is provided a robot system comprising the primary manipulator, the secondary manipulator, the load sensor and a control system according to the second aspect. The primary manipulator, the secondary manipulator and the load sensor may be of any type described in connection with the first and second aspects.

The robot system may comprise a first industrial robot and a second industrial robot. In this case, the first industrial robot may comprise the primary manipulator and the second industrial robot may comprise the secondary manipulator. The first industrial robot and the second industrial robot may be of the same type or of different types (e.g. with different ratings). Moreover, a common control system may be used to control both the primary manipulator and the secondary manipulator. This common control system may be a first control system of the first industrial robot, a second control system of the second industrial robot or a separate control system.

Alternatively, the robot system may comprise a single industrial robot having both the primary manipulator and the secondary manipulator. Such industrial robot may be a dual-arm robot. If one arm needs to be calibrated, the other arm can be used as a measurement device. The method and the control system according to the present disclosure greatly facilitate replacement of a first arm of a dual-arm robot since a second arm of the dual-arm robot can be used to calibrate a third arm replacing the first arm. The load sensor may be detachably attached to each of the primary mounting interface and the secondary mounting interface.

The robot system may further comprise a connection member comprising the load sensor and configured to be rigidly connected to each of the primary mounting interface and the secondary mounting interface. The connection member may be rigid.

The load sensor may be configured to provide load data indicative of forces and/or torques.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
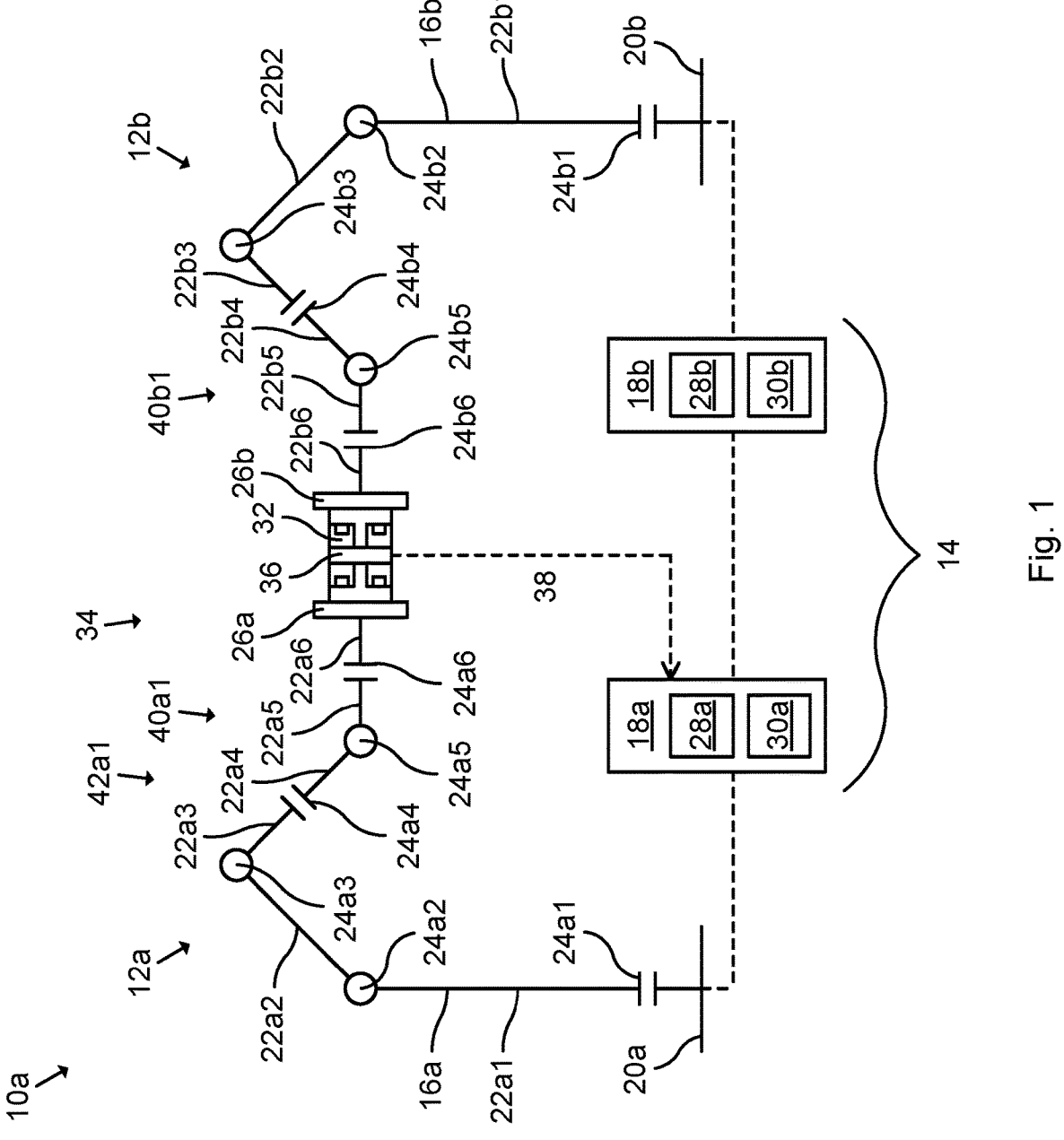
FIG. 1: schematically represents one example of a robot system comprising a first industrial robot having a primary manipulator and a second industrial robot having a secondary manipulator when the primary manipulator is in one example of a calibration state.

In the following, a method of calibrating a manipulator of an industrial robot, a control system for calibrating a manipulator of an industrial robot, and a robot system comprising a control system, will be described. The same or similar reference numerals will be used to denote the same or similar structural features.

FIG. 1 schematically represents one example of a robot system 10*a*. The robot system 10*a* comprises a first industrial robot 12*a*, a second industrial robot 12*b* and a control system 14. Each of the first industrial robot 12*a* and the second industrial robot 12*b* may for example be a welding robot at a common production site.

The first industrial robot 12*a* comprises a primary manipulator 16*a* and a primary robot controller 18*a*. The primary manipulator 16*a* of this specific example is a serial manipulator comprising a primary base 20*a*, a primary first link 22*a*1 rotatable relative to the primary base 20*a* at a primary first joint 24*a*1, a primary second link 22*a*2 rotatable relative to the primary first link 22*a*1 at a primary second joint 24*a*2, a primary third link 22*a*3 rotatable relative to the primary second link 22*a*2 at a primary third joint 24*a*3, a primary fourth link 22*a*4 rotatable relative to the primary third link 22*a*3 at a primary fourth joint 24*a*4, a primary fifth link 22*a*5 rotatable relative to the primary fourth link 22*a*4 at a primary fifth joint 24*a*5, and a primary sixth link 22*a*6 rotatable relative to the primary fifth link 22*a*5 at a primary sixth joint 24*a*6. One, several or all of the primary links 22*a*1-22*a*6 may also be referred to with reference numeral "22*a*". One, several or all of the primary joints 24*a*1-24*a*6 may also be referred to with reference numeral "24*a*". The primary manipulator 16*a* further comprises a plurality of primary angle measuring devices (not shown) for reading the positions of the primary joints 24*a*.

The second industrial robot 12*b* comprises a secondary manipulator 16*b* and a secondary robot controller 18*b*. The secondary manipulator 16*b* of this specific example is a serial manipulator comprising a secondary base 20*b*, a secondary first link 22*b*1 rotatable relative to the secondary base 20*b* at a secondary first joint 24*b*1, a secondary second link 22*b*2 rotatable relative to the secondary first link 22*b*1 at a secondary second joint 24*b*2, a secondary third link 22*b*3 rotatable relative to the secondary second link 22*b*2 at a secondary third joint 24*b*3, a secondary fourth link 22*b*4 rotatable relative to the secondary third link 22*b*3 at a secondary fourth joint 24*b*4, a secondary fifth link 22*b*5 rotatable relative to the secondary fourth link 22*b*4 at a secondary fifth joint 24*b*5, and a secondary sixth link 22*b*6 rotatable relative to the secondary fifth link 22*b*5 at a secondary sixth joint 24*b*6. One, several or all of the secondary links 22*b*1-22*b*6 may also be referred to with reference numeral "22*b*". One, several or all of the secondary joints 24*b*1-24*b*6 may also be referred to with reference numeral "24*b*". The secondary manipulator 16*b* further comprises a plurality of secondary angle measuring devices (not shown) for reading the positions of the secondary joints 24*b*.

The manipulators 16*a* and 16*b* in FIG. 1 are however merely two of many examples. One or both manipulators 16*a* and 16*b* may for example also comprise one or more translational joints.

The primary manipulator 16*a* further comprises a primary mounting interface 26*a*, here exemplified as a primary tool flange. The primary mounting interface 26*a* is in this example fixed to the primary sixth link 22*a*6. A primary tool center point, TCP, is defined in relation to the primary mounting interface 26*a*.

The secondary manipulator 16*b* further comprises a secondary mounting interface 26*b*, here exemplified as a secondary tool flange. The secondary mounting interface 26*b* is in this example fixed to the secondary sixth link 22*b*6. A secondary TCP is defined in relation to the secondary mounting interface 26*b*.

The control system 14 of this example comprises the primary robot controller 18*a* and the secondary robot controller 18*b*. The control system 14 in FIG. 1 is however merely one of many examples. The primary robot controller 18*a* of this example comprises a primary data processing device 28*a* and a primary memory 30*a*. The primary memory 30*a* comprises a computer program containing program code, which when executed by the primary data processing device 28*a*, causes the primary data processing device 28*a* to execute, or command execution of, various steps as described herein. The primary robot controller 18*a* is in signal communication with the primary manipulator 16*a* and the secondary robot controller 18*b*.

The secondary robot controller 18*b* of this example comprises a secondary data processing device 28*b* and a secondary memory 30*b*. The secondary memory 30*b* comprises a computer program containing program code, which when executed by the secondary data processing device 28*b*, causes the secondary data processing device 28*b* to execute, or command execution of, various steps as described herein.

The robot system 10*a* of this example further comprises a connection member 32. The connection member 32 is a rigid piece that is rigidly connected to each of the primary mounting interface 26*a* and the secondary mounting interface 26*b*, here by means of screws (not denoted). The connection member 32 can be attached to, and detached from, the mounting interfaces 26*a* and 26*b* by a human user. When the primary mounting interface 26*a* is fixed to the secondary mounting interface 26*b*, the primary manipulator 16*a* and the secondary manipulator 16*b* form a common kinematic chain 34. The primary TCP and the secondary TCP are here coinciding in a common point. The offset between the primary TCP and the secondary TCP may alternatively be known.

The robot system 10*a* further comprises a load sensor 36. The load sensor 36 is arranged in the connection member 32. The load sensor 36 is thereby positioned between the mounting interfaces 26*a* and 26*b*.

The load sensor 36 is configured to measure loads and to issue load data 38 indicative of the measured loads. The load sensor 36 is in signal communication with the control system 14, here with the primary robot controller 18*a*. The load sensor 36 may be a commercially available load sensor, and is here exemplified as a six axis (three forces and three torques) load sensor.

In FIG. 1, the primary manipulator 16*a* is controlled by the primary robot controller 18*a* to be positioned in a first primary manipulator pose 40*a*1. The secondary manipulator 16*b* is controlled by the secondary robot controller 18*b* in a lead-through mode. Since the manipulators 16*a* and 16*b* are connected, the secondary manipulator 16*b* adopts a first secondary manipulator pose 40*b*1 when the primary manipulator 16*a* adopts the first primary manipulator pose 40*a*1. Based on the load data 38, the primary robot controller 18*a* has positioned the primary manipulator 16*a* such that no forces and no torques are transferred between the manipulators 16*a* and 16*b*. If the connection member 32 in theory was cut in half to separate the manipulators 16*a* and 16*b*, the manipulators 16*a* and 16*b* would thereby not move. The state of the primary manipulator 16*a* when the primary manipulator 16*a* adopts the first primary manipulator pose 40*a*1 and when no forces or torques are transferred between the manipulators 16*a* and 16*b* constitutes a first calibration state 42*a*1 of the primary manipulator 16*a*. As an alternative to lead-through control of the secondary manipulator 16*b*, the secondary manipulator 16*b* may be controlled to move based on the load data 38.

In this example, the primary manipulator 16*a* is well calibrated and the secondary manipulator 16*b* is not calibrated. In order to calibrate the secondary manipulator 16*b*, the primary joint positions of the primary joints 24*a* are recorded by the primary robot controller 18*a* when the primary manipulator 16*a* is in the first calibration state 42*a*1. The primary robot controller 18*a* then calculates a primary TCP pose based on the primary joint positions by means of forward kinematics using a model of the primary manipulator 16*a*. The primary robot controller 18*a* then communicates the primary TCP pose to the secondary robot controller 18*b*. Since the relationship between the primary TCP pose and the secondary TCP pose is known, the secondary robot controller 18*b* can determine the secondary TCP pose based on the primary TCP pose. In this example however, the primary TCP pose and the secondary TCP pose coincide when the primary mounting interface 26*a* is fixed to the secondary mounting interface 26*b*. The secondary robot controller 18*b* then calculates calculated secondary joint positions of the secondary joints 24*b* based on the secondary TCP pose by means of inverse kinematics using a model of the secondary manipulator 16*b*. The secondary manipulator 16*b* of the second industrial robot 12*b* can then be calibrated based on the calculated secondary joint positions and recorded secondary joint positions of the secondary joints 24*b* as recorded by the secondary robot controller 18*b* in the first calibration state 42*a*1. In case the secondary manipulator 16*b* would comprise more than six degrees of freedom, one, several or all of the recorded secondary joint positions may additionally be considered for calculating the calculated secondary joint positions based on the secondary TCP pose.

By controlling the primary manipulator 16*a* such that no, or very small, forces and torques are transferred between the manipulators 16*a* and 16*b*, deflections of the manipulators 16*a* and 16*b* are eliminated or reduced. This improves the accuracy of the calibration.

Figure 2:
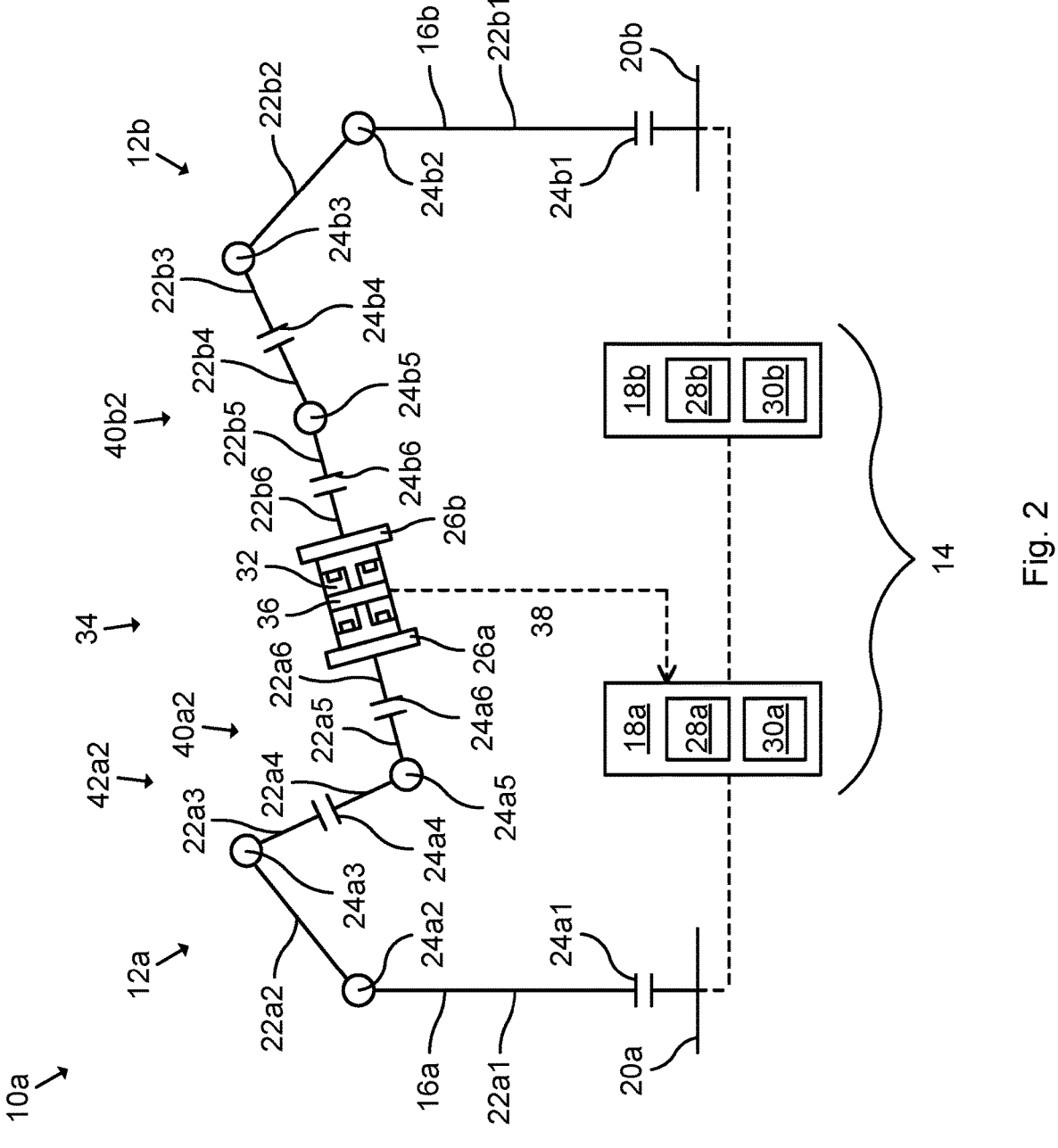
FIG. 2: schematically represents the robot system when the primary manipulator is in a further example of a calibration state.

FIG. 2 schematically represents the robot system 10*a* when the primary manipulator 16*a* is in a second calibration state 42*a*2. The second calibration state 42*a*2 differs from the first calibration state 42*a*1 in that the primary manipulator 16*a* is positioned in a second primary manipulator pose 40*a*2. As a consequence, the secondary manipulator 16*b*, which is controlled in lead-through mode, follows the primary manipulator 16*a* and becomes positioned in a second secondary manipulator pose 40*b*2. Also in the second calibration state 42*a*2, no forces or torques are transferred between the manipulators 16*a* and 16*b*. The second primary manipulator pose 40*a*2 may be selected so as to maximize movements of the joints 24*a* and 24*b*.

The control system 14 then calculates calculated secondary joint positions and records recorded joint positions of the secondary joints 24*b* for the second calibration state 42*a*2 in the same way as described in connection with FIG. 1. Several sets of recorded secondary joint positions and corresponding recorded joint positions can then be used to further improve the calibration, e.g. one set for each calibration state 42*a*1 and 42*a*2.

Figure 3:
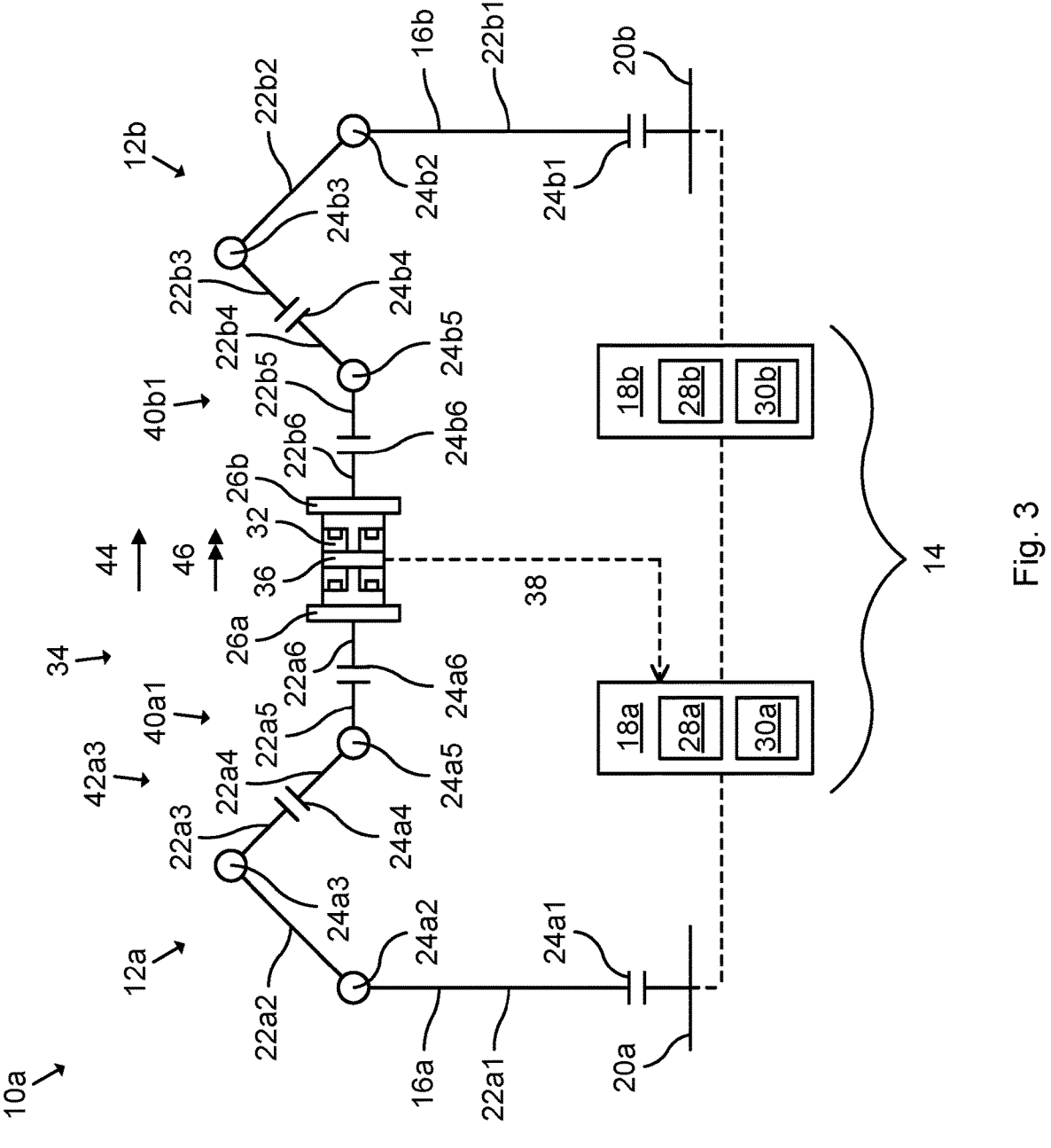
FIG. 3: schematically represents the robot system when the primary manipulator is in a further example of a calibration state.

FIG. 3 schematically represents the robot system 10*a* when the primary manipulator 16*a* is in a third calibration state 42*a*3. The third calibration state 42*a*3 differs from the first calibration state 42*a*1 in that the primary manipulator 16*a* exerts a force 44 and a torque 46 on the secondary manipulator 16*b*. To this end, the primary robot controller 18*a* controls the primary manipulator 16*a* to exert a predetermined force 44 and a predetermined torque 46 based on the load data 38. The secondary manipulator 16*b* is here not controlled in lead-through, but is instead controlled with a high stiffness. In FIG. 3, the primary manipulator 16*a* is in the first primary manipulator pose 40*a*1 and the secondary manipulator 16*b* is in the first secondary manipulator pose 40*b*1.

In order to calibrate the secondary manipulator 16*b*, the primary joint positions of the primary joints 24*a* and the load data 38 are recorded by the primary robot controller 18*a* when the primary manipulator 16*a* is in the third calibration state 42*a*3. The primary robot controller 18*a* then calculates a primary TCP pose based on the primary joint positions and the load data 38 by means of forward kinematics. In case the load data 38 should not be considered for the calculation of the primary TCP pose when the primary manipulator 16*a* exerts the force 44 and the torque 46 on the secondary manipulator 16*b*, the primary TCP pose would be erroneous due to the deflection of the primary manipulator 16*a*. The primary robot controller 18*a* then communicates the primary TCP pose and the load data 38 to the secondary robot controller 18*b*. Since the relationship between the primary TCP pose and the secondary TCP pose is known, the secondary robot controller 18*b* can determine the secondary TCP pose based on the primary TCP pose. The secondary robot controller 18*b* then calculates calculated secondary joint positions of the secondary joints 24*b* based on the secondary TCP pose and the load data 38 by means of inverse kinematics. To this end, the force 44 and the torque 46 are also modelled. The secondary manipulator 16*b* can then be calibrated based on the calculated secondary joint positions and recorded secondary joint positions of the secondary joints 24*b* as recorded by the secondary robot controller 18*b* for the third calibration state 42*a*3. Several sets of recorded secondary joint positions corresponding recorded joint positions can then be used to further improve the calibration, e.g. one set for each calibration state 42*a*1, 42*a*2 and 42*a*3.

Figure 4:
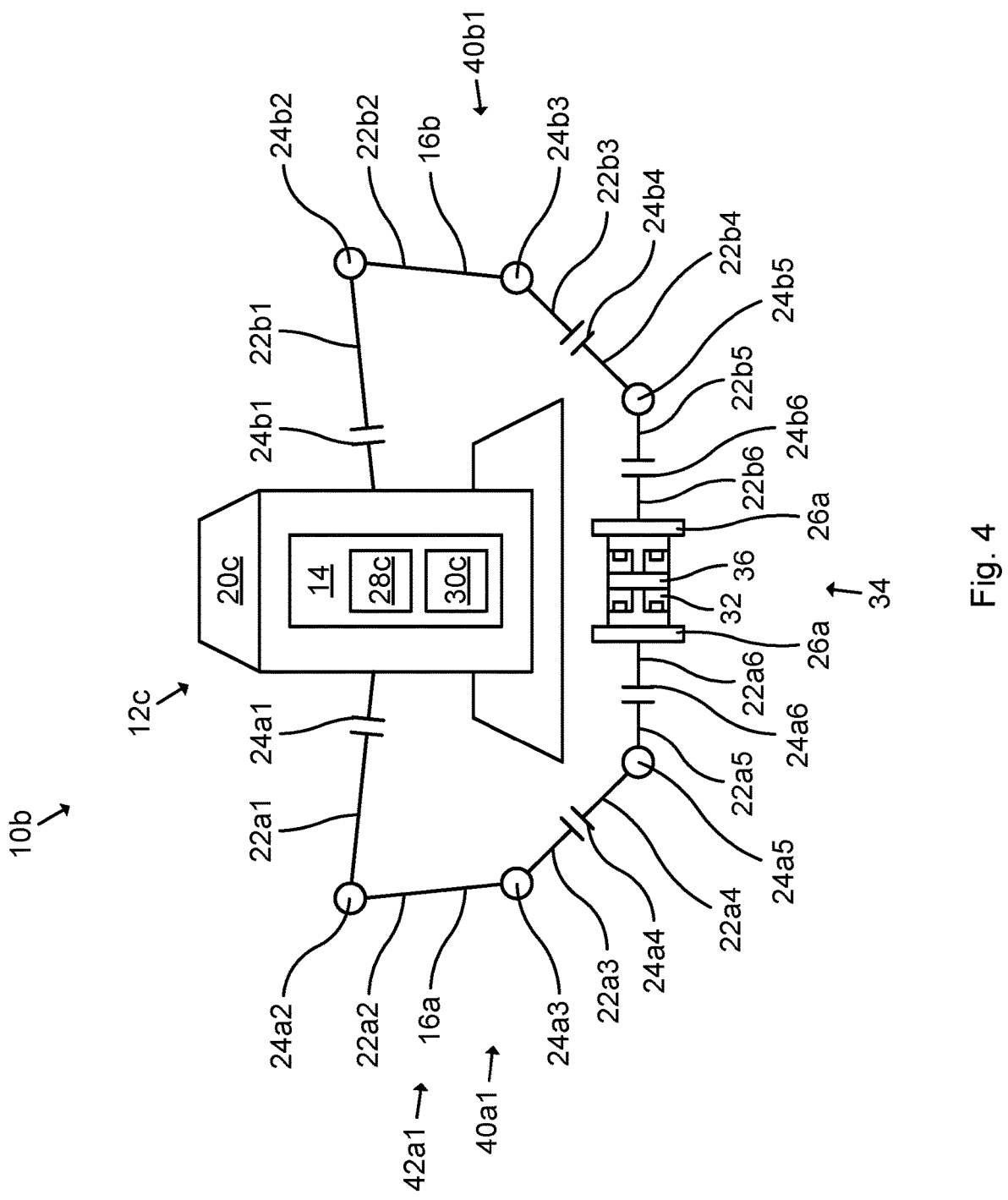
FIG. 4: schematically represents a further example of a robot system comprising a third industrial robot having a primary manipulator and a secondary manipulator when the primary manipulator is in one example of a calibration state.

FIG. 4 schematically represents a further example of a robot system 10*b*. The robot system 10*b* comprises a single industrial robot 12*c*. The industrial robot 12*c* comprises a primary manipulator 16*a* and a secondary manipulator 16*b*. The industrial robot 12*c* further comprises a base 20*c* from which the primary manipulator 16*a* and the secondary manipulator 16*b* extend. The industrial robot 12*c* is a dual-arm robot, such as the YuMi sold by ABB. The control system 14 of the industrial robot 12*c* is here constituted by a single robot controller comprising a data processing device 28*c* and a memory 30*c*. The principles of calibrating the industrial robot 12*c* correspond to the principles of calibrating the industrial robot 12*b*.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of calibrating a manipulator of an industrial robot, the method comprising:

providing a primary manipulator having one or more primary joints and a primary tool flange;

providing a secondary manipulator having one or more secondary joints and a secondary tool flange, where the primary tool flange is rigidly connected to the secondary tool flange;

providing a load sensor between the primary tool flange and the secondary tool flange, the load sensor being configured to provide load data indicative of loads between the primary tool flange and the secondary tool flange;

controlling the primary manipulator to adopt at least one calibration state;

for each calibration state, recording a primary joint position of at least one primary joint;

calibrating the secondary manipulator based on the at least one recorded primary joint position;

wherein the primary manipulator is controlled to adopt the at least one calibration state based on the load data and/or wherein the calibration of the secondary manipulator is additionally made based on the load data, and wherein the calibration of the secondary manipulator includes:

determining a primary tool center point, TCP, pose of the primary manipulator based on the at least one primary joint position, and based on the load data in case the calibration of the secondary manipulator is additionally made based on the load data, via forward kinematics for each calibration state;

recording a secondary joint position of at least one secondary joint for each calibration state;

calculating a calculated secondary joint position of at least one secondary joint based on the primary TCP pose and optionally based on the load data in case the calibration of the secondary manipulator is additionally made based on the load data, via inverse kinematics for each calibration state; and calibrating the secondary manipulator based on the at least one recorded secondary joint position and the at least one calculated secondary joint position for each calibration state.

2. The method according to claim 1, wherein the method comprises controlling the primary manipulator to adopt a plurality of calibration states, each calibration state being a unique manipulator pose of the primary manipulator.

3. The method according to claim 2, wherein the method further comprises moving the primary manipulator to a plurality of calibration states while moving the secondary manipulator by the primary manipulator of via lead-through.

4. The method according to claim 2, wherein the load sensor is configured to provide load data indicative of forces and/or torques.

5. The method according to claim 2, wherein the primary manipulator is controlled to adopt the at least one calibration state based on the load data, and wherein a load, as measured by the load sensor, is minimized or locally minimized in each manipulator pose.

6. The method according to claim 5, wherein the method further comprises moving the primary manipulator to a plurality of calibration states while moving the secondary manipulator by the primary manipulator via lead-through.

7. The method according to claim 1, wherein the load sensor is configured to provide load data indicative of forces and/or torques.

8. The method according to claim 1, wherein the primary tool flange is positioned distal from at least one of the one or more primary joints, and wherein the secondary tool flange is positioned distal from at least one of the one or more secondary joints.

9. A control system for calibrating a manipulator of an industrial robot, the control system comprising at least one processor and at least one memory having at least one computer program stored thereon, the at least one computer program including a program code which, when executed by the at least one processor, causes the at least one processor to perform the steps of:

receiving load data from a load sensor indicative of loads, the load sensor being positioned between a primary tool flange of a primary manipulator having one or more primary joints and a secondary tool flange of a secondary manipulator having one or more secondary joints, where the primary tool flange is rigidly connected to the secondary tool flange;

controlling the primary manipulator to adopt at least one calibration state;

for each calibration state, recording a primary joint position of at least one primary joint;

calibrating the secondary manipulator based on the at least one recorded primary joint position;

wherein the primary manipulator is controlled to adopt the at least one calibration state based on the load data and/or wherein the calibration of the secondary manipulator is additionally made based on the load data; and wherein the calibration of the secondary manipulator comprises:

determining a primary tool center point, TCP, pose of the primary manipulator based on the at least one primary joint position, and based on the load data in case the calibration of the secondary manipulator is additionally made based on the load data, via forward kinematics for each calibration state;

recording a secondary joint position of at least one secondary joint for each calibration state;

calculating a calculated secondary joint position of at least one secondary joint based on the primary TCP pose, and based on the load data in case the calibration of the secondary manipulator is additionally made based on the load data via inverse kinematics for each calibration state; and calibrating the secondary manipulator based on the at least one recorded secondary joint position and the at least one calculated secondary joint position for each calibration state.

10. The control system according to claim 9, wherein the at least one computer program comprises program code which, when executed by the at least one processor, causes the at least one processor to perform the steps of:

controlling the primary manipulator to adopt a plurality of calibration states, each calibration state being a unique manipulator pose of the primary manipulator.

11. The control system according to claim 10, wherein the at least one computer program comprises program code which, when executed by the at least one processor, causes the at least one processor to perform the steps of:

controlling the secondary manipulator in a lead-through mode; and controlling the primary manipulator to move to the plurality of calibration states while controlling the secondary manipulator in the lead-through mode.

12. The control system according to claim 10, wherein the at least one computer program comprises program code which, when executed by the at least one processor, causes the at least one processor to perform the step of controlling the primary manipulator to adopt the at least one calibration state based on the load data; and wherein a load, as measured by the load sensor, is minimized or locally minimized in each manipulator pose.

13. The control system according to claim 12, wherein the at least one computer program comprises program code which, when executed by the at least one data processor, causes the at least one processor to perform the steps of:

controlling the secondary manipulator in a lead-through mode; and controlling the primary manipulator to move to a plurality of calibration states while controlling the secondary manipulator in the lead-through mode.

14. A robot system comprising:

a primary manipulator, a secondary manipulator, a load sensor, and a control system including at least one processor and at least one memory having at least one computer program stored thereon, the at least one computer program including a program code which, when executed by the at least one processor, causes the at least one processor to perform the steps of:

receiving load data from a load sensor indicative of loads, the load sensor being positioned between a primary tool flange of a primary manipulator having one or more primary joints and a secondary tool flange of a secondary manipulator having one or more secondar joints, where the primary tool flange is rigidly connected to the secondary tool flange;

controlling the primary manipulator to adopt at least one calibration state;

for each calibration state, recording a primary joint position of at least one primary joint;

calibrating the secondary manipulator based on the at least one recorded primary joint position;

wherein the primary manipulator is controlled to adopt the at least one calibration state based on the load data and/or wherein the calibration of the secondary manipulator is additionally made based on the load data; and wherein the calibration of the secondary manipulator comprises:

determining a primary tool center point, TCP, pose of the primary manipulator based on the at least one primary joint position and based on the load data in case the calibration of the secondary manipulator is additionally made based on the load data, via forward kinematics for each calibration state;

recording a secondary joint position of at least one secondary joint for each calibration state;

calculating a calculated secondary joint position of at least one secondary joint based on the primary TCP pose, and based on the load data in case the calibration of the secondary manipulator is additionally made based on the load data, via inverse kinematics for each calibration state; and calibrating the secondary manipulator based on the at least one recorded secondary joint position and the at least one calculated secondary joint position for each calibration state.

15. The robot system according to claim 14, wherein the load sensor is configured to provide load data indicative of forces and/or torques.

16. The robot system according to claim 14, further comprising a connection member including the load sensor and configured to be rigidly connected to each of the primary tool flange and the secondary tool flange.

17. The robot system according to claim 16, wherein the load sensor is configured to provide load data indicative of forces and/or torques.

* * * * *